Oct. 26, 1943. C. M. G. VILLARD 2,332,877
GALVANOMETER COIL SUPPORT
Filed July 4, 1939
   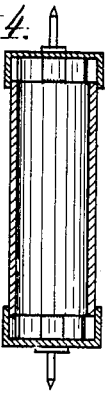
Fig.1. Fig.2. Fig.3. Fig.4.
   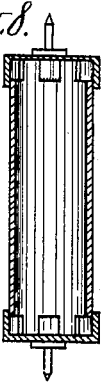
Fig.5. Fig.6. Fig.7. Fig.8.
Fig.9. Fig.10. Fig.11.
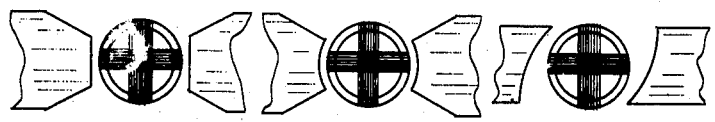
Fig.12. Fig.13. Fig.14.
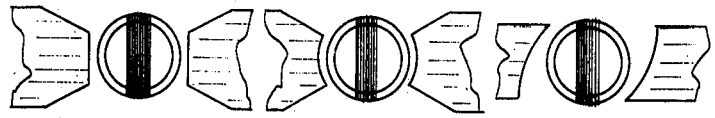
Inventor:
Claude, Marie, Gabriel, Villard,
By
Glascock, Downing &
Seebold,
Attorneys.

Patented Oct. 26, 1943

2,332,877

UNITED STATES PATENT OFFICE 2,332,877

GALVANOMETER COIL SUPPORT

Claude Marie Gabriel Villard, Paris, France; vested in the Alien Property Custodian Application July 4, 1939, Serial No. 282,756
In France July 7, 1938

2 Claims. (Cl. 171—95)

The present invention relates to improvements which are constituted by new arrangements for the construction of galvanometric equipment, in particular those of the type having a fixed magnet and movable coils.

These arrangements are particularly advantageous in the case of apparatus having multiple movable coils, so-called crossed coils. In fact, when, as is the general case, said apparatus comprises a fixed core, the support adapted to maintain said core in a suitable position between the pole pieces, limits the amplitude of the movements of the movable equipment.

The invention is characterised mainly by the fact that the movable equipment is constituted by an element (simple or compound) of tubular shape, said element serving as support for winding the wire (or wires) constituting the coil (or coils) which said movable equipment is to comprise.

The invention is also characterised by other arrangements which will be described hereinafter, which arrangements can be used conjointly or separately and some of which are illustrated simply by way of indication in the accompanying diagrammatic drawing, in which:

Fig. 1 is a perspective view of one tubular support, per se.

Fig. 2 is a similar view of the tubular support showing two coils or windings arranged thereon at 90° relative to each other.

Fig. 3 is a perspective view of the completed support showing the pivot carrying members applied thereto.

Fig. 4 is a vertical sectional view of the arrangement shown in Fig. 3.

Fig. 5 is a perspective view of another tubular support.

Fig. 6 is a similar view of the support with only one single coil or winding applied thereto.

Fig. 7 is a perspective view of the completed article having only one coil.

Fig. 8 is a vertical sectional view of the arrangement shown in Fig. 7.

Figs. 9 to 11 show diagrammatically in plan the movable elements of the form shown in Figs. 1 to 4 arranged between pole pieces of varied shapes, and Figs. 12 to 14 show diagrammatically in plan the movable elements of the form shown in Figs. 5 to 8 inclusive arranged between pole pieces of varied shapes.

According to the invention various methods can be used for facilitating the winding of the wire: for instance, as shown in Fig. 1 of the drawing, the support can be constituted by a tubular element provided, at both ends with the number of notches necessary for the number of coils to be effected, then, when the windings have been effected (Fig. 2) the members carrying the pivots (Figs. 3 and 4) can be secured on the tooth-like parts existing between the notches.

This arrangement relates to an apparatus having a movable equipment comprising two coils crossed at 90°.

Figs. 5 to 8 of the drawing show a galvanometric equipment having a single coil (equipment having a single movable coil) devised according to the invention.

It is to be understood that arrangements similar to those of Figs. 1 to 4 and Figs. 5 to 8 can be obtained either by effecting any number of coils, or, in the case of Figs. 5 to 8, by effecting two coils in the same notches, so as to obtain a differential galvanometer.

Of course, both pivots can be distinct, or can be constituted by a single shaft member passing through the common axis of the closure members, as diagrammatically shown in Figs. 9 through 12.

It is also to be understood that the windings can be guided by suitable countersunk parts formed according to the generatrices of the tubular support or of the outer element of said tubular support.

The movable equipment is mounted, through the medium of known means, between the pole pieces of the magnet, said pole pieces having, of course, shapes suitable for the purpose to be attained, so as to suitably satisfy the desired conditions of density and distribution of the magnetic flux.

Figs. 9 to 11 and Figs. 12 to 14 of the drawing diagrammatically show, respectively, and by way of example, the movable elements which have just been described, placed between pole pieces of varied shapes.

Concerning the material or materials constituting the support for the windings and the constructional details of said support, the present invention allows of obtaining a complete range of arrangements answering to the various requirements of practice.

Thus, if, for instance, a high damping of the equipment is to be obtained, a metal of high electric conductivity is used for the construction of the tubular support.

When it is desired to act on the concentration or the distribution of the magnetic flux and to reduce the air-gap effect, use is made, for constituting the tubular support, of a metal of high magnetic permeability.

On the contrary, in other cases, it may eventually be advantageous to use a tubular support made of a suitable material, either of the insulating kind, or of the type of low magnetic permeability.

Finally, it is obvious that, in certain cases, the support may be given any tubular shape instead of a cylindrical tubular shape.

The examples given in the foregoing are not limiting examples and are solely adopted to allow the advantages of the present invention to be more clearly understood.

What I claim as my invention and desire to secure by Letters Patent is:

1. A galvanometer armature comprising: a tubular member having a pair of radial slots at each of its ends; a rectangular coil wound with long sides extending lengthwise on the tubular member and with short sides at the ends of the tubular member extending through said slots whereby the long sides of the coil lie flat against the longitudinal outer surface of the tubular member and extends across the ends of the tubular member at the slots; and a pivot cap at each end of the tubular member comprising, a cap which fits over the slotted end of the tubular member and substantially covers the adjacent end of the coil, and a rigid piot extending substantially from said cap along the axis of the tubular member, whereby the two pivot caps provide a pivotal support for the armature.

2. Apparatus as described in claim 1 wherein there are four slots at each end of the tubular member and two coils are provided on the tubular member with their axis substantially at right angles.

CLAUDE MARIE GABRIEL VILLARD.